Patented Dec. 12, 1939

2,182,825

UNITED STATES PATENT OFFICE 2,182,825

DERIVATIVES OF ANDROSTENOLS AND A METHOD OF MAKING THE SAME

Arthur Serini, Berlin, Lothar Strassberger, Berlin-Wilmersdorf, and Willy Logemann, Berlin, Germany, assignors to Schering Aktiengesellschaft, a corporation of Germany No Drawing. Application January 27, 1936, Serial No. 61,086. In Germany January 29, 1935

23 Claims. (Cl. 260—397)

This invention relates to derivatives of androstenols and more particularly to hydroxylated and halogenated androstenols that represent valuable therapeutical products having the physiological activity of the male sex hormones or that may be used as intermediate products for the production of other hormones, and a method of producing the same.

One object of this invention is to provide derivatives of androstendiols, wherein the hydroxy group at the carbon atom 3 is transformed into a group that, on hydrolysis, is reconvertible into the hydroxy group, such as the ether, the ester and the like groups. These compounds are obtained according to this invention by reducing the carbonylic group of the corresponding derivatives of androstenolone to the secondary alcohol group.

Another object of this invention is to provide compounds, wherein the secondary alcohol group at the carbon atom 17 of said mono hydroxy derivatives of androstendiols is replaced by halogen. Of course, it is possible to use as starting material for making these halogenated compounds mono hydroxy derivatives of androstendiols that have been made by another method than by reducing the corresponding derivatives of androstenolone, for instance, by partially esterifying the androstendiols or by other methods.

The following structural formulas serve to illustrate the reactions described and claimed in this application, mono hydroxy derivatives of the androstenolone, dehydroandrosterone being illustrated as starting materials:

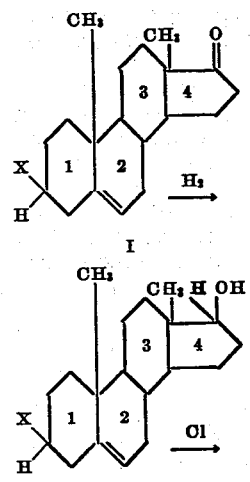

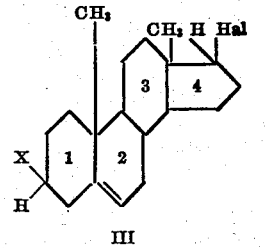

In these formulas X represents a group which, upon hydrolysis, is reconvertible into the hydroxy group, such as the O-acyl, O-alkyl, O-aryl, and the like groups.

The reduction of the hydroxy derivatives of androstenolone to the corresponding derivatives of androstendiol is carried out by means of specific methods of reduction, wherein only the keto group is reduced to the secondary alcohol group while the double bond is not affected and no saponification takes place. Especially suitable methods are those wherein use is made of amalgams, such as aluminum amalgam and the like. But also other methods may be employed as they are known to those skilled in the art.

The conversion of the secondary alcohol group at the carbon atom 17 into halogen may also be carried out in a known manner. As halogenating agents, for instance, may preferably be used phosphorus chlorides or bromides, thionyl chloride and the like, i. e. halogen compounds that contain besides the exchangeable halogen atom an element or a group of atoms that is capable of combining with oxygen or the hydroxy group.

The following examples serve to illustrate this invention without, however, limiting the same to them.

Example 1

2 grams of the acetate of androstenolone are dissolved in 50 cc. of ether, 5 grams of freshly prepared aluminum amalgam are added thereto, whereupon 5 cc. of water are allowed to drop gradually into said reaction mixture, whereupon the ether is caused to boil for a certain period of time. As soon as the reaction is finished the aluminum hydroxide sludge is filtered off by suction and washed with ether. The ethereal solution is concentrated by evaporation until crystals begin to form. The crystals are filtered off and may be purified by recrystallization from methanole or hexane. 1.6 to 1.8 grams of androstendiol-3-acetate having a melting point of 144° C. are obtained.

1.1 grams of androstendiol-3-acetate are dissolved in 5 cc. of dry carbon tetrachloride. To this solution there are added 0.7 gram of phosphorus pentachloride while cooling with ice. The reaction mixture is allowed to stand at room-temperature and is several times thoroughly shaken. After about 12 hours the clear solution is poured into ice-water and extracted with ether. The ethereal solution is washed with sodium carbonate solution and water, dried and evaporated to dryness. The residue obtained thereby is recrystallized from a mixture of acetone and methanol, whereby 3-acetoxy-17-chloro-androsten of the melting point of 170° C. is obtained in a yield of about 60-70% of the theoretical amount.

*Example 2*

2 grams of nickel alloy skeleton catalyst obtained according to Raney (Homer-Adkins "Hydrogenation of Derivatives of Pyridine", Jour. of Am. Chem. Soc. 1934, page 2425; see also ibid. 1932, page 4116) and consisting of the skeleton residue of the treatment, with water or aqueous alkaline solutions, of a mass of nickel fused with one or more substances which are dissolved or disintegrated by water or aqueous alkaline solutions, are pretreated with hydrogen at 50° C. in 30 cc. of ethanol. Thereupon 2 grams of the acetate of androstenolone are added thereto and hydrogen is introduced into the solution at room-temperature while shaking thoroughly and continuously. As soon as one molecule of hydrogen is absorbed, the reduction is completed. The catalyst is removed by filtration, the solution is evaporated to dryness and the residue is recrystallized from methanol or hexane. Thus, the mono acetate of androstendiol of the melting point of 144° C. is obtained with an almost quantitative yield.

0.5 gram of androstendiol-3-acetate are dissolved in 5 cc. of carbon tetrachloride. To this solution 0.5 gram of freshly precipitated calcium carbonate are added. Thereupon 0.65 gram of phosphorus pentabromide are mixed while cooling with ice and the reaction mixture is allowed to stand for 5 hours at room-temperature while shaking repeatedly. It is then worked up as described in Example 1 and the residue obtained on evaporating the ether is purified by repeatedly dissolving the same in ether and precipitating with petroleum ether. Thus, 3-acetoxy-17-bromo-androsten is obtained in a yield of about 50-60% of the theoretical amount.

Of course, various modifications and changes in the reaction conditions etc. may be made by those skilled in the art in accordance with the principles set forth herein and in the claims annexed hereto.

What we claim is:

1. A method for the production of halogenated androstenol compounds comprising subjecting androstenolone compounds, wherein the hydroxy group is replaced by a group that, upon hydrolysis, is reconvertible into the hydroxy group, to the action of reducing agents capable of reducing the carbonylic group of said androstenol compounds to the secondary alcohol group, substantially without affecting the double bond present in said androstenolone compounds, and replacing the secondary alcohol group of the androstendiol compound obtained, by halogen.

2. A method according to claim 1, wherein the reduction of the carbonylic group of the androstenolone compound is carried out by means of hydrogen in the presence of a catalyst.

3. A method according to claim 1, wherein the reduction is carried out by means of hydrogen in statu nascendi obtained by the reaction of amalgams with water.

4. A method according to claim 1, wherein the reduction is carried out by means of hydrogen in the presence of a nickel skeleton catalyst.

5. A method according to claim 1, wherein the halogenation is carried out by reacting the androstendiol compound with phosphorus halogenides.

6. A method according to claim 1, wherein the halogenating treatment is carried out in the presence of an organic solvent that is not affected by said halogenating agent.

7. A method for the production of androstendiol compounds comprising subjecting an androstenolone compound, wherein the hydroxy group is replaced by a group that, upon hydrolysis, is reconvertible into the hydroxy group, to the action of a reducing agent capable of reducing the carbonylic group of said androstenol compounds to the secondary alcohol group, substantially without affecting the double bond present in said androstenolone compound, and isolating the androstendiol compound obtained.

8. A method according to claim 7, wherein the androstenolone compound is dissolved in an organic solvent and mixed with an amalgam and water, whereupon the androstendiol compound obtained is separated from the reaction mixture.

9. A method for the production of a mono ester of androstendiols comprising subjecting an ester of androstenolone to the action of a reducing agent capable of reducing the carbonylic group without affecting the double bond in said androstenolone ester, and isolating the mono ester of androstendiol obtained thereby.

10. A method for producing 17-halogen androstenol compounds comprising subjecting androstendiol compounds, wherein the hydroxy group at the carbon atom 3 is replaced by a group that upon hydrolysis is reconvertible into the hydroxy group, to the action of a halogenating agent and isolating the reaction product.

11. A method according to claim 10, wherein a halogenating agent is used that contains besides the exchangeable halogen atom a group of atoms that is capable of combining with and removing a hydroxy group.

12. A method according to claim 10, wherein as halogenating agent a compound is used that is selected from a group of compounds consisting of phosphorus halogenides and thionyl chloride.

13. A method of producing esters of 17-halogen androstenols comprising subjecting a 3-mono ester of androstendiol to the action of a halogenating agent and isolating the reaction product.

14. A 3-substituted androstendiol, having the general formula $C_{19}H_{29}O(X)$, wherein X represents a group that upon hydrolysis is reconvertible into the hydroxy group, and corresponding to the following structural formula:

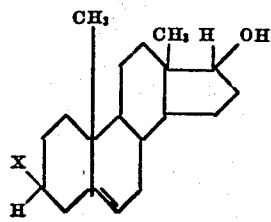

15. An acetate of androstendiol, having the following structural formula:

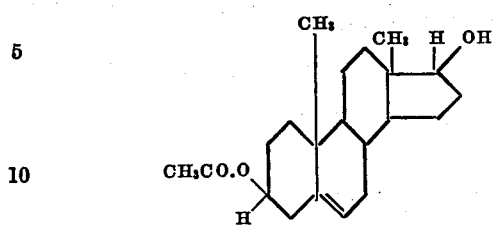

and a melting point of 144° C.

16. A 17-halogen androstenol compound of the general formula C19H28Hal(X), wherein Hal represents a halogen and X a group that upon hydrolysis is reconvertible into the hydroxy group, said compound corresponding to the following structural formula:

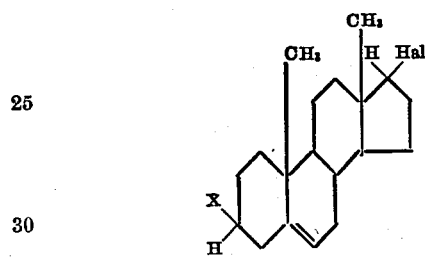

17. A 3-acetoxy-17-chloro-androsten of the following structural formula:

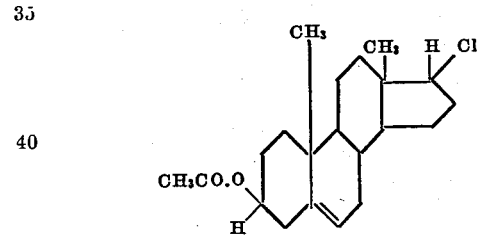

and a melting point of 170° C.

18. A 3-acetoxy-17-bromo-androsten of the following structural formula:

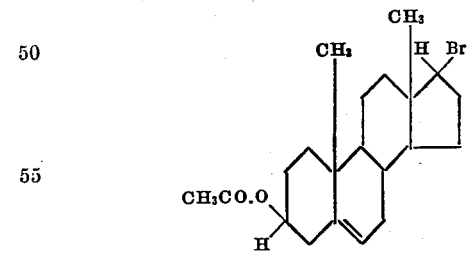

19. A derivative of androstendiol of the general formula C19H28(X)(Y) wherein X is a group which on hydrolysis is converted into a hydroxy group, and Y is a member of the group consisting of hydroxyl and halogen, and corresponding to the following structural formula:

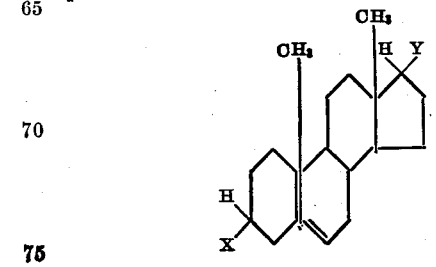

20. A process for the manufacture of the mono-acetate of androstene-diol of the formula

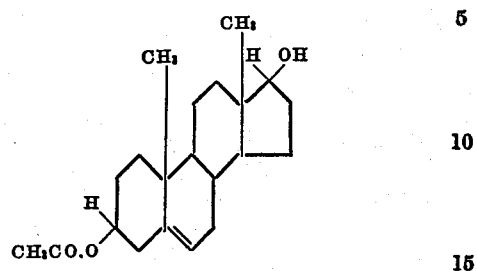

consisting in reducing the keto-group of the acetate of dehydro-androsterone of the formula

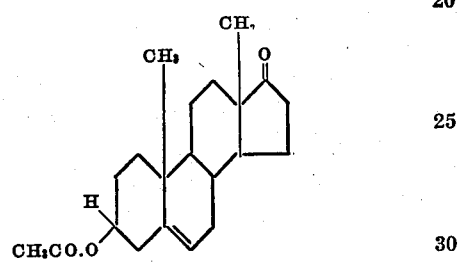

to a carbinol group with hydrogen in presence of a non-noble hydrogenating metal catalyst in a neutral medium.

21. The mono-acetate of an androstene-diol having the formula

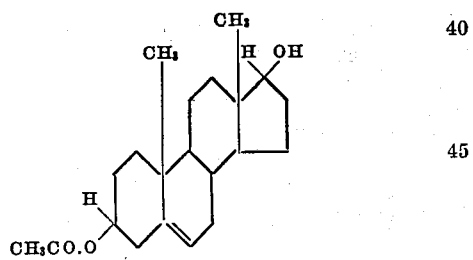

22. A process for the manufacture of derivatives of unsaturated polycyclic alcohols containing a sterol-like nucleus, consisting in reducing the keto-group of compounds of the formula

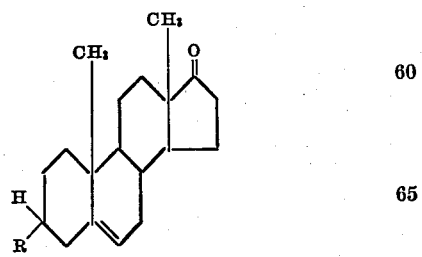

wherein R stands for a member of the group consisting of acyloxy and alkoxy, to a carbinol group with hydrogen in the presence of nickel in a non-acid medium.

23. A process for the manufacture of derivatives of unsaturated polycyclic alcohols containing a sterol-like nucleus, consisting in reducing the keto-group of compounds of the formula
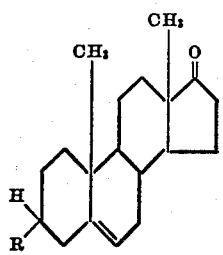
wherein R stands for a member of the group consisting of acyloxy and alkoxy, to a carbinol group with hydrogen in the presence of nickel in a neutral medium.
ARTHUR SERINI.
LOTHAR STRASSBERGER.
WILLY LOGEMANN.